(12) United States Patent
Kassanoff et al.

(10) Patent No.: US 9,565,928 B2
(45) Date of Patent: Feb. 14, 2017

(54) DESKTOP ORGANIZATION AND DISPLAY STAND SYSTEM

(71) Applicant: Paragon Furniture, LP, Arlington, TX (US)

(72) Inventors: Richard Kassanoff, Dallas, TX (US); Robert Larry Stewart, Grapevine, TX (US)

(73) Assignee: Paragon Furniture, LP, Arlington, TX (US)

( * ) Notice: Subject to any disclaimer, the term of this patent is extended or adjusted under 35 U.S.C. 154(b) by 0 days.

(21) Appl. No.: 14/069,104

(22) Filed: Oct. 31, 2013

(65) Prior Publication Data

US 2014/0124641 A1 May 8, 2014

Related U.S. Application Data

(60) Provisional application No. 61/767,597, filed on Feb. 21, 2013, provisional application No. 61/721,987, filed on Nov. 2, 2012.

(51) Int. Cl.
*A47B 85/00* (2006.01)
*A47B 17/04* (2006.01)
(Continued)

(52) U.S. Cl.
CPC .............. *A47B 17/04* (2013.01); *A47B 13/00* (2013.01); *A47B 13/003* (2013.01); *A47B 19/00* (2013.01); *A47B 19/04* (2013.01); *A47B 21/00* (2013.01); *A47B 21/06* (2013.01); *A47B 41/00* (2013.01); *A47B 41/02* (2013.01); *A47B 2021/0321* (2013.01); *A47B 2021/0335* (2013.01); *A47B 2021/0357* (2013.01); *A47B 2021/0364* (2013.01); *A47B 2021/062* (2013.01); *A47B 2021/066* (2013.01); *A47B 2023/047* (2013.01); *A47B 2083/003* (2013.01);
(Continued)

(58) Field of Classification Search
CPC ...... A47F 5/0018; A47F 5/0025; A47B 19/00; A47B 19/04; A47B 13/16; A47B 21/00; A47B 2021/0335; A47B 2021/0357; A47B 21/06; A47B 2021/062; A47B 41/00; A47B 2083/003; A47B 2021/0321; A47B 2021/0364; A47B 13/00; A47B 13/003; A47B 41/02; A47B 2023/047
USPC ....... 248/309.1, 311.2, 447; 206/45.23, 45.2, 206/45.24, 751; 108/25, 26, 32, 50.01; 312/194, 312/195; 174/482
See application file for complete search history.

(56) References Cited

U.S. PATENT DOCUMENTS 1,067,816 A * 7/1913 Jersemann ...................... 108/32
3,290,108 A * 12/1966 Beckman et al. ............ 312/281
(Continued)

FOREIGN PATENT DOCUMENTS

GB WO 2010086659 A2 * 8/2010 .............. B60M 5/00

*Primary Examiner* — Brian Mattei
*Assistant Examiner* — Taylor Morris
(74) *Attorney, Agent, or Firm* — Elizabeth Philip Dahm; Kelly J. Kubasta; Ferguson, Braswell & Fraser, P.C.

(57) ABSTRACT

A desktop organization and display stand system generally providing an integrated system for desks and workstations that is convertible between a conventional working surface, and a display shelf to support a variety of objects including electronic media, such as a tablet computer, laptop computer, smart phone, electronic display, flat panel monitor,
(Continued)

television, books, magazines, other printed materials, other suitable object and/or electronic media, or any combination thereof.

20 Claims, 18 Drawing Sheets

(51) Int. Cl.

| | |
|---|---|
| A47B 41/04 | (2006.01) |
| A47B 37/00 | (2006.01) |
| A47K 1/08 | (2006.01) |
| A47B 97/04 | (2006.01) |
| B65D 5/52 | (2006.01) |
| B65D 25/24 | (2006.01) |
| A47F 5/00 | (2006.01) |
| A47B 21/00 | (2006.01) |
| A47B 83/00 | (2006.01) |
| A47B 19/04 | (2006.01) |
| A47B 21/06 | (2006.01) |
| A47B 13/00 | (2006.01) |
| A47B 21/03 | (2006.01) |
| A47B 19/00 | (2006.01) |
| A47B 23/04 | (2006.01) |
| A47B 41/02 | (2006.01) |
| A47B 41/00 | (2006.01) |

(52) U.S. Cl.
CPC ..... A47B 2200/0006 (2013.01); A47F 5/0018 (2013.01); A47F 5/0025 (2013.01)

(56) References Cited

U.S. PATENT DOCUMENTS

| | | | | |
|---|---|---|---|---|
| 4,372,629 | A | * | 2/1983 | Propst et al. ............. 312/223.6 |
| 4,654,756 | A | * | 3/1987 | Wilson et al. ................ 361/827 |
| 5,083,512 | A | * | 1/1992 | Newhouse et al. ........ 108/50.02 |
| 5,231,562 | A | * | 7/1993 | Pierce et al. ................. 361/832 |
| 6,138,863 | A | * | 10/2000 | Aiken ........................... 220/819 |
| 6,327,983 | B1 | * | 12/2001 | Cronk .................... A47B 21/06 108/50.02 |
| 6,397,762 | B1 | * | 6/2002 | Goldberg et al. .......... 108/50.02 |
| 7,025,627 | B2 | * | 4/2006 | Rosenthal et al. ............ 439/501 |
| 7,205,488 | B2 | * | 4/2007 | Riner .................... H02G 3/185 174/481 |
| 7,757,612 | B2 | * | 7/2010 | Korber et al. .................. 108/25 |
| 7,901,224 | B1 | * | 3/2011 | Black et al. ................. 439/142 |
| 7,966,951 | B1 | * | 6/2011 | Black et al. ............... 108/50.02 |
| 2011/0101195 | A1 | * | 5/2011 | Skolnik ........................ 248/446 |

* cited by examiner

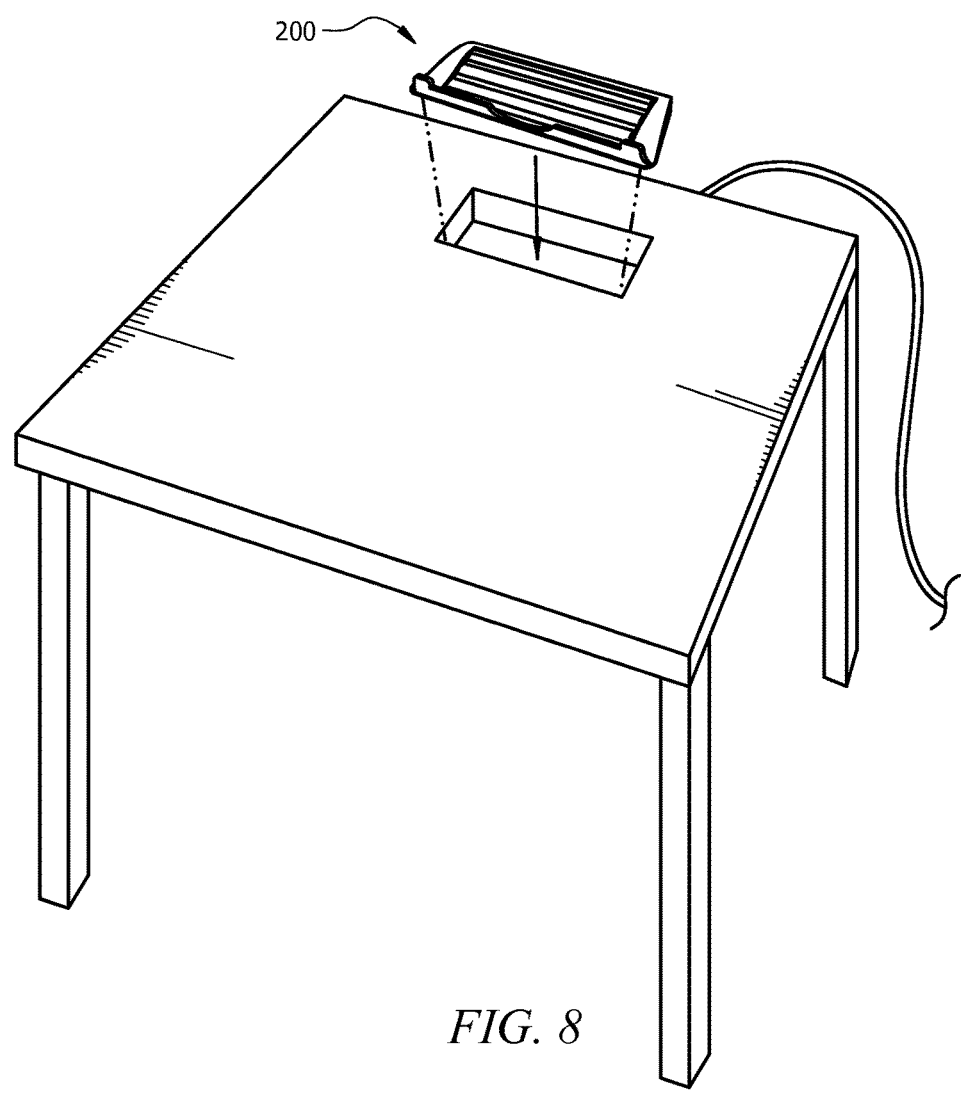
FIG. 8
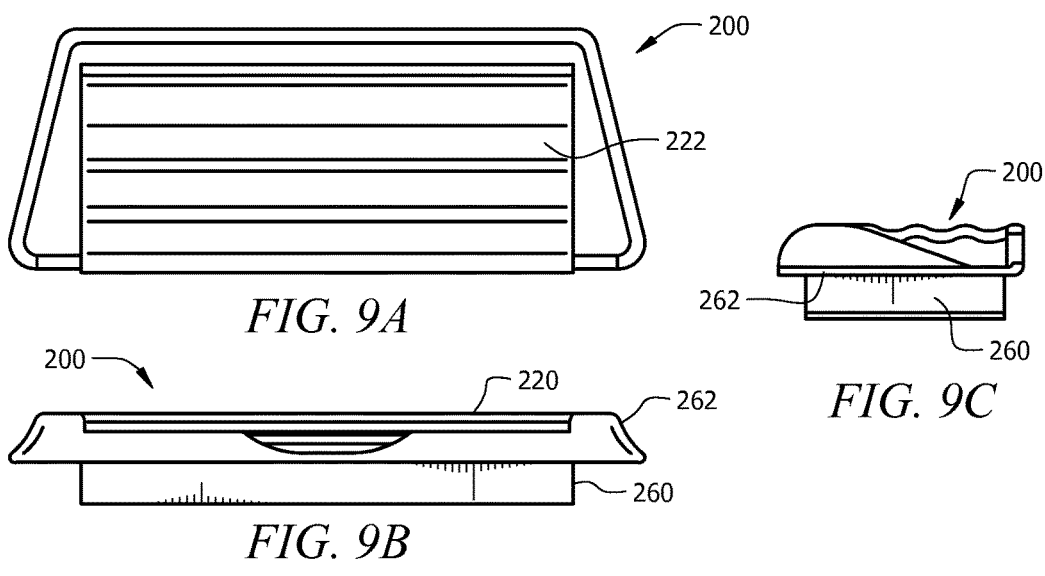
FIG. 9A
FIG. 9B
FIG. 9C

DESKTOP ORGANIZATION AND DISPLAY STAND SYSTEM

CROSS REFERENCE TO RELATED APPLICATIONS

The present application claims the benefit under 35 U.S.C. §119(e) of U.S. Provisional Patent Application Ser. No. 61/767,597 filed Feb. 21, 2013 and entitled "Desktop Organization and Display Stand System," and U.S. Provisional Patent Application Ser. No. 61/721,987 filed Nov. 2, 2012 and entitled "Desktop Organization and Display Stand System," each of which is incorporated herein by reference for all purposes.

FIELD OF THE DISCLOSURE

The present disclosure relates generally to furniture systems and, in particular, to desktop organization and display stand systems.

BACKGROUND

With the rapid evolution of media and technology in recent years, tablet computers, smart phones and other such electronic media have become major components of everyday life. Such tools are becoming increasingly common for use during educational study and work. Conventional desk systems typically comprise standard, flat desktops, and are generally not designed to accommodate or provide easy access or secure storage for such devices during use.

SUMMARY

Embodiments of the present disclosure generally provide an integrated desktop organization and display stand system comprising a plurality of components that may include, but is not limited to, a pivot panel having a top surface and a support surface, a ledge, and a nest, all coupled to a desk sleeve.

Embodiments the present disclosure generally provide an integrated desktop organization and display stand system for desks and work stations that is convertible between a conventional working surface, and a display shelf to support a variety of objects including electronic media, such as a tablet computer, laptop computer, smart phone electronic display, flat panel monitor, television, hooks, magazines, other suitable object electronic media, or any combination thereof.

Embodiments of the present disclosure may provide a desktop organization and display strand system for use in conjunction with a desktop, the system including a frame having central opening, and a top panel which may be coupled to the frame at a pivot point such that the top panel may be flippable between a closed position and an open position. In some embodiments, a lower surface of the frame may be coupled to a portion of a desktop having a flat edge. In other embodiments, the frame may further include a rounded shoulder embedded in an outer surface of the frame such that the system is capable of being coupled to a portion of a desktop having a rounded edge. In alternative embodiments, the frame may also be disposed within a desktop surface. The top panel may be flush against an upper surface of the frame when the top panel is in the closed position. In one embodiment, at least one ledge member may be coupled to an inner surface of the frame, and the top panel may lean against the frame when the top panel is in the open, position, such that the top panel and the at least one ledge member form a display stand. The frame may include at least one port to receive, route, organize, secure and store wires, cables and other electronic accessories. In one embodiment, the at least one ledge member may include at least one port to receive, route, organize, secure and store wires, cables and other electronic accessories. In one embodiment, the at least one ledge member further comprises at least one USB connection. The at least one ledge member may include at least one electric outlet. The top panel may include ridges to retain objects when the top panel is in the closed position. The desktop organization and display stand system may also include nest coupled to the frame capable of Scenting and storing electronic devices, books, and other objects. The nest may include a wire management system that that receives, routes, organizes, secures and stores wires, cables, and other electronic accessories from the electronic device.

Embodiments of the present disclosure may provide a desktop organization and display stand system for use in conjunction with a desktop, the system including a frame having a central opening, a top panel, coupled to the frame at a pivot point such that the top panel is flippable between a closed position and an open position, at least one ledge member coupled to an of the frame, and a nest coupled to a lower surface of the frame capable of securing and storing electronic devices, hooks, and other objects. In one embodiment, a lower surface of the frame may be coupled to a desktop having a flat edge. In alternative embodiments, the frame may be disposed shoulder: embedded in an outer surface of the frame such that the system is capable of trying coupled to a desktop having a rounded edge. In alternative embodiments, the frame may be disposed within a desktop surfaced. The top panel may be flush against an upper surface of the frame when the top panel is in the closed position, and the top panel may lean against the frame when the top panel is in the open position, such that the top panel and the at least one ledge member may form a display stand. The top panel may include ridges to retain objects when the top panel is in the closed position.

Other technical features may be readily apparent to one skilled in the art from the following figures, descriptions and claims.

BRIEF DESCRIPTION OF THE DRAWINGS

For a more complete understanding of this disclosure and its features, reference is now made to the following description, taken in conjunction with the accompanying drawings, in which:

FIG. 8 is a perspective view of the desktop organization and display stand system being retrofitted within a desk or workstation according to one embodiment of the present disclosure;

FIGS. 9a-9c provide a top view front elevation view and a side view of a desktop organization and display stand system according to one embodiment of the present disclosure.

DETAILED DESCRIPTION

Embodiments of the present disclosure generally provide an integrated desktop organization and display stand system for desks and workstations that converts a portion of a conventional work surface to a display stand that may be employed to accommodate a variety of objects including electronic media, printed materials, other suitable objects, or any combination thereof.

FIGS. 1-5 illustrate a desktop organization and display stand system 100 according to an embodiment of the present disclosure. It should be understood that system 100 is shown for illustrative purposes only and that any other suitable system or subsystem could be used in conjunction with, or in lieu of, system 100 according to one embodiment of the present disclosure.

FIGS. 1-5 illustrate a desktop organization and display stand system 100 according to an embodiment of the present disclosure. It should be understood that system 100 is shown for illustrative purposes only and that any other suitable system or subsystem could be used in conjunction with, or in lieu of, system 100 according to one embodiment of the present disclosure.

In one embodiment of the present disclosure, system 100 may generally house, retain, or otherwise support, for example, a tablet computer, laptop computer, smart phone, electronic display, flat panel monitor, a television screen, liquid crystal display (LCD) screen, plasma screen, high definition television (HDTV) screen, projection television screen, computer screen, video conferencing display, other suitable devices, connections, outlets, or areas, or any combination thereof.

In other embodiments, system 100 may be employed to store and display books, magazines, documents, other printed material, records, compact discs, collectable paraphernalia, personal items, a marker board, magnetic board, chalk board, tack board, sticker board, design board, other suitable objects, or any combination thereof.

Figure 1A:
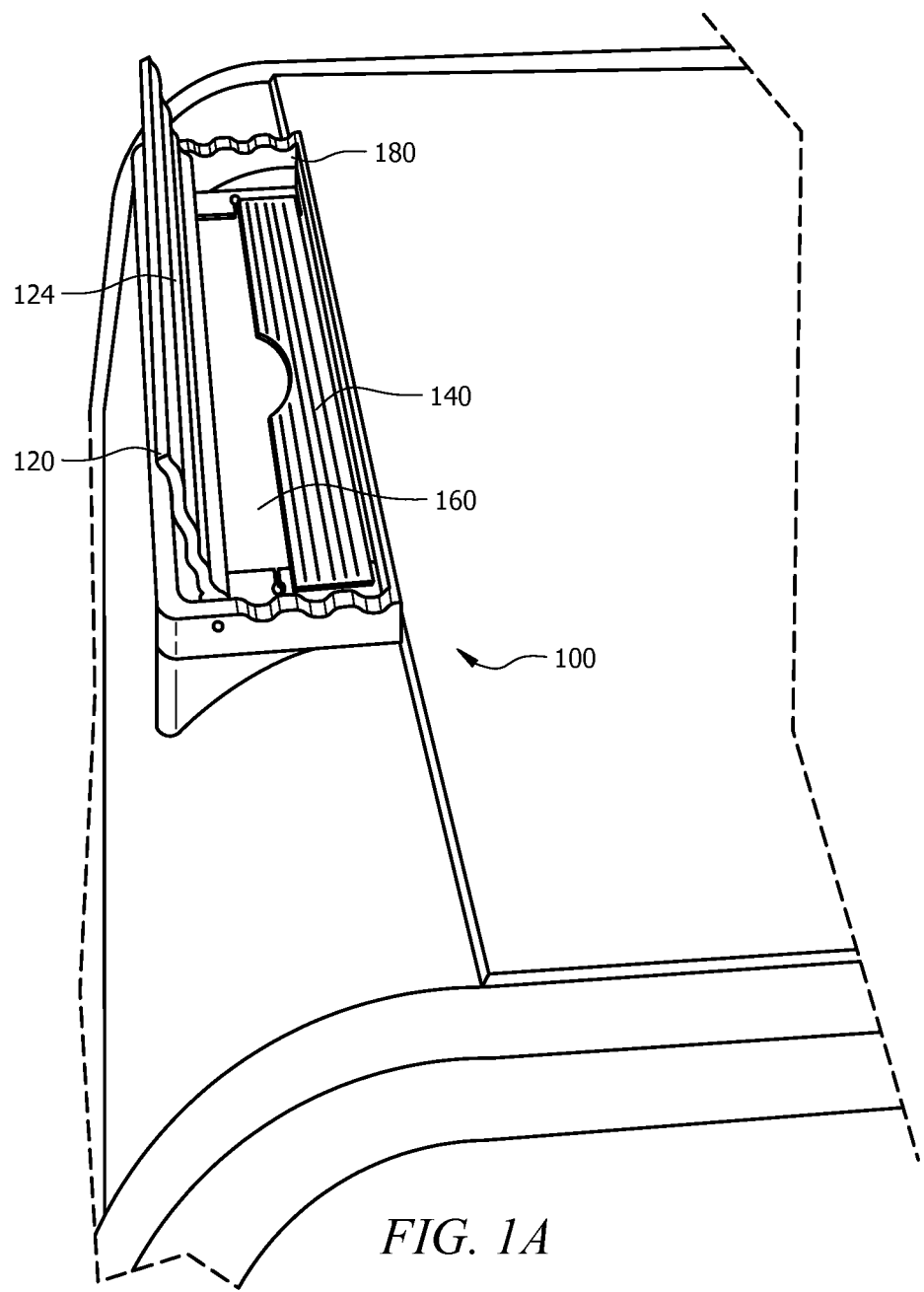
FIGS. 1a and 1b provide perspective views of a desktop organization and display stand system integrated within a desk or workstation and oriented in an engaged state according to one embodiment of the present disclosure.
Figure 1B:
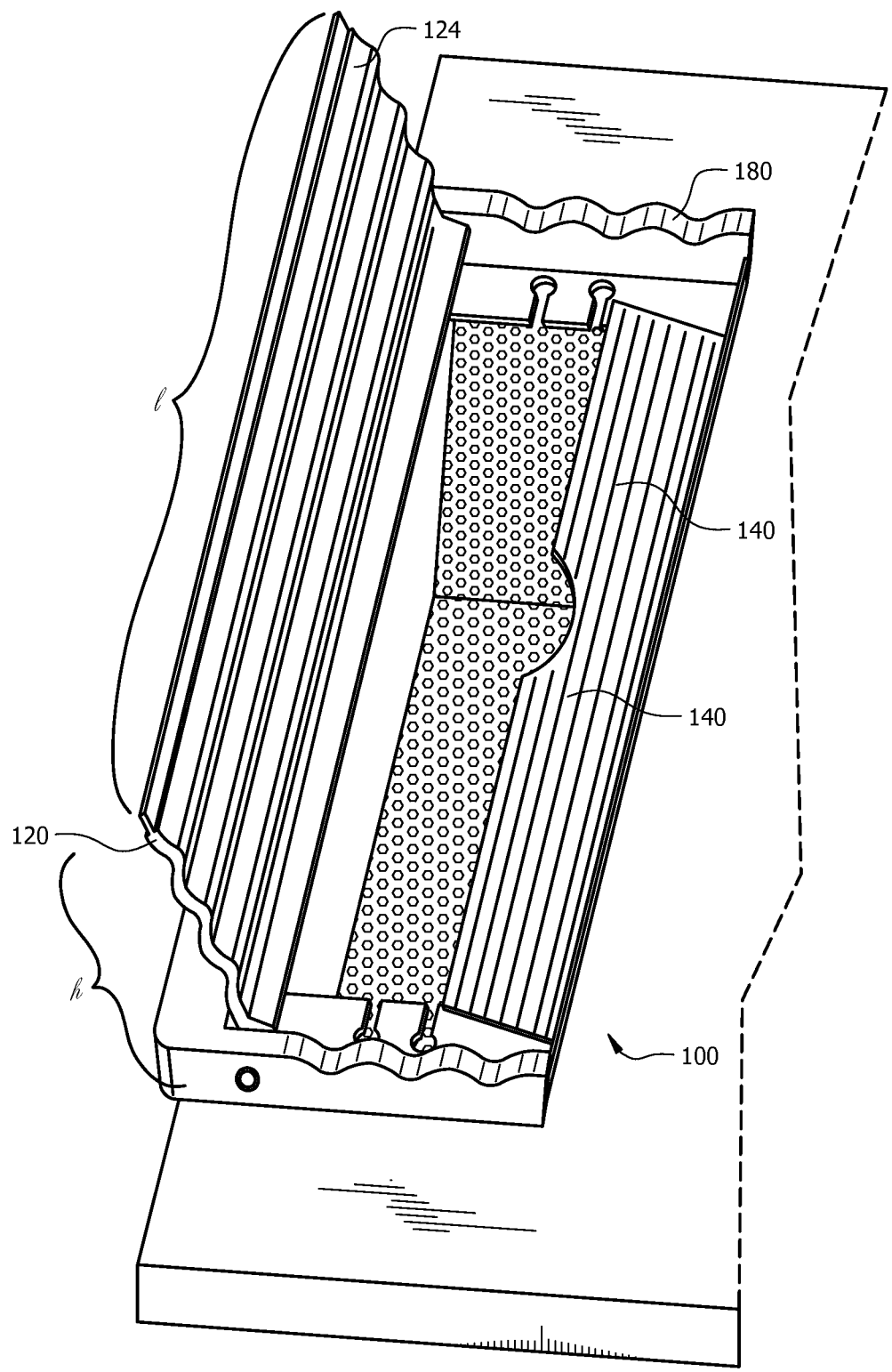

According to an embodiment of the present disclosure, system 100 may comprise a pivot panel 120, a ledge 140 and a nest 160, each coupled to a desk sleeve 180. Which may be integrated onto the top surface of a desk or workstation. System 100 may be adapted to conform to any desk configuration such as, for example, with a desk having a rounded front, as shown in FIG. 1a, or with a desk having a squared-off front, as shown in FIG. 1b.

In various embodiments, system 100 may be integrated at any position on the desktop as desired or necessary. For example, if a desk comprises a privacy wall or shield at the front of the desk, system 100 may be Configured to be integrated inwardly on the desktop.

In alternative embodiments, system 100 may be coupled to the edge of a top surface of a desk or workstation, rather than being integrally constructed with the OEM. In this manner, system 100 could be retrofitted to any table, desk, workstation, or other structure.

Pivot panel 120 comprises a top surface 122 and a support surface 124.

In one embodiment, nest 160 comprises a cuboid that allows a user to store objects and/or electronic media while not in use.

The height, shape, size and other dimensions of pivot panel 120, nest 160, ledge 140 and desk sleeve 180 may be varied depending on the desired objects and/or electronic media devices to be displayed and stored. For example, in some embodiments, the dimensions of pivot panel 120 and nest 160 may be increased when larger objects and/or electronic media devices are to be displayed and/or stored, such as a large bulletin board, large black board, large screen television, other large object and/or electronic media devices, or a combination thereof.

Pivot panel 120 may be connected or otherwise coupled to desk sleeve 180 in any suitable manner such as having male and female coupling adapters, having a ball and socket attachment, having a brass ring and chain attachment, a clip or pin attachment, or using other suitable coupling materials, or any combination, thereof.

In an engaged state, as shown in FIGS. 1a and 1b, system 100 may be employed to accommodate a variety of objects, which may rest on ledge 140 and be braced by support surface 12A.

In alternative embodiments, ledge 140 may be coupled or otherwise: connected to support surface 124.

In embodiments of the present disclosure, system 100 allows the display and use of a variety of objects without engaging the desktop, thereby substantially extending the surface area of the desk or workstation.

Figure 2A:
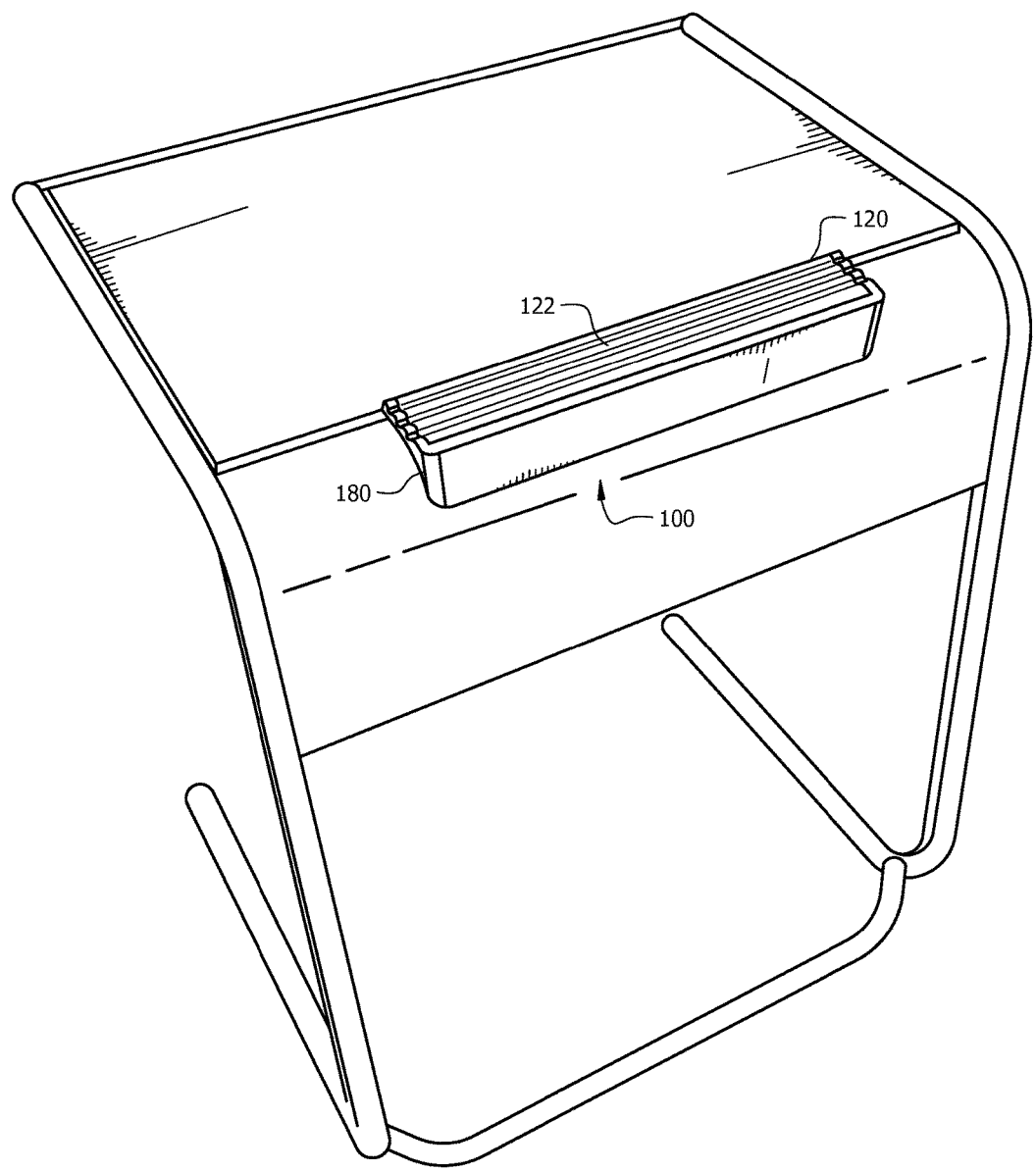
FIGS. 2a and 2b provide perspective views of the desktop organization and display stand system of FIGS. 1a and 1b integrated within a desk workstation and oriented in a disengaged state according to one embodiment of the present disclosure.
Figure 2B:
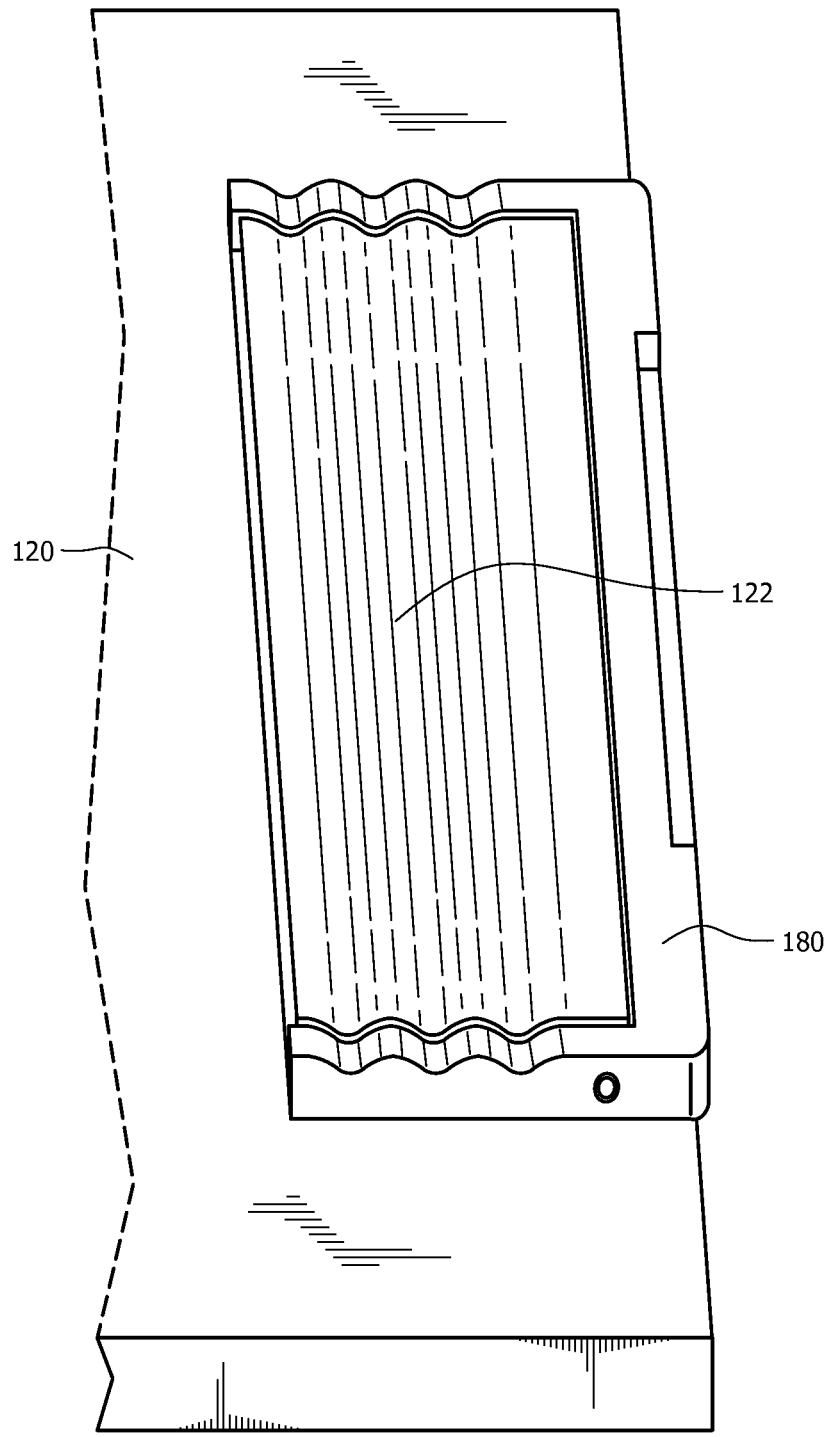

FIGS. 2a and 2b depict perspective views of system 100 integrated within a desk or workstation and oriented in a disengaged state.

In the disengaged state, pivot panel 120 flushy abuts the top of desk sleeve 180 such that the top surface 122 is exposed and a continuous look to the surface plane of the desk is provided according to one embodiment of the present disclosure.

In the disengaged state, top surface 122 may be employed as part of the desk surface, workspace, writing surface, storage space, organization platform, other suitable uses, or any combination thereof.

In one embodiment, top surface 122 may have ridges or grooves that may be employed to store pens, pencils, markers, other writing instruments, styli, other working: instruments, other suitable objects, or any combination thereof.

In one embodiment accessories, cups, holders and other suitable retaining mechanisms may be attached to the sides, back or front of system 100 to accommodate additional objects and/or electronic media devices, such as, for example pens, pencils, markets, other writing instruments, styli, other working instruments, cables, water bottles, soda bottles, juice bottles, coffee cups, mp3 players, audio devices, cellular phones, smart phones, cameras, other suitable objects or electronic media devices, or a combination thereof.

Figure 3A:
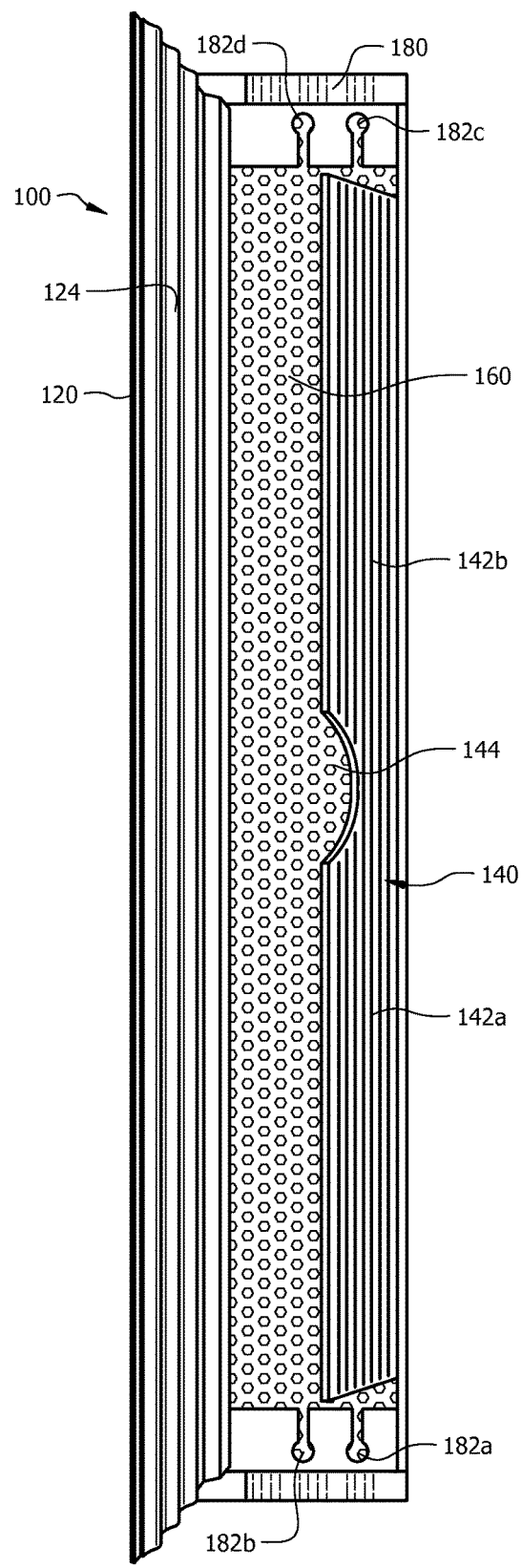
FIG. 3a is a top view of a desktop organization and display stand system according to one embodiment of the present disclosure.
Figure 3B:
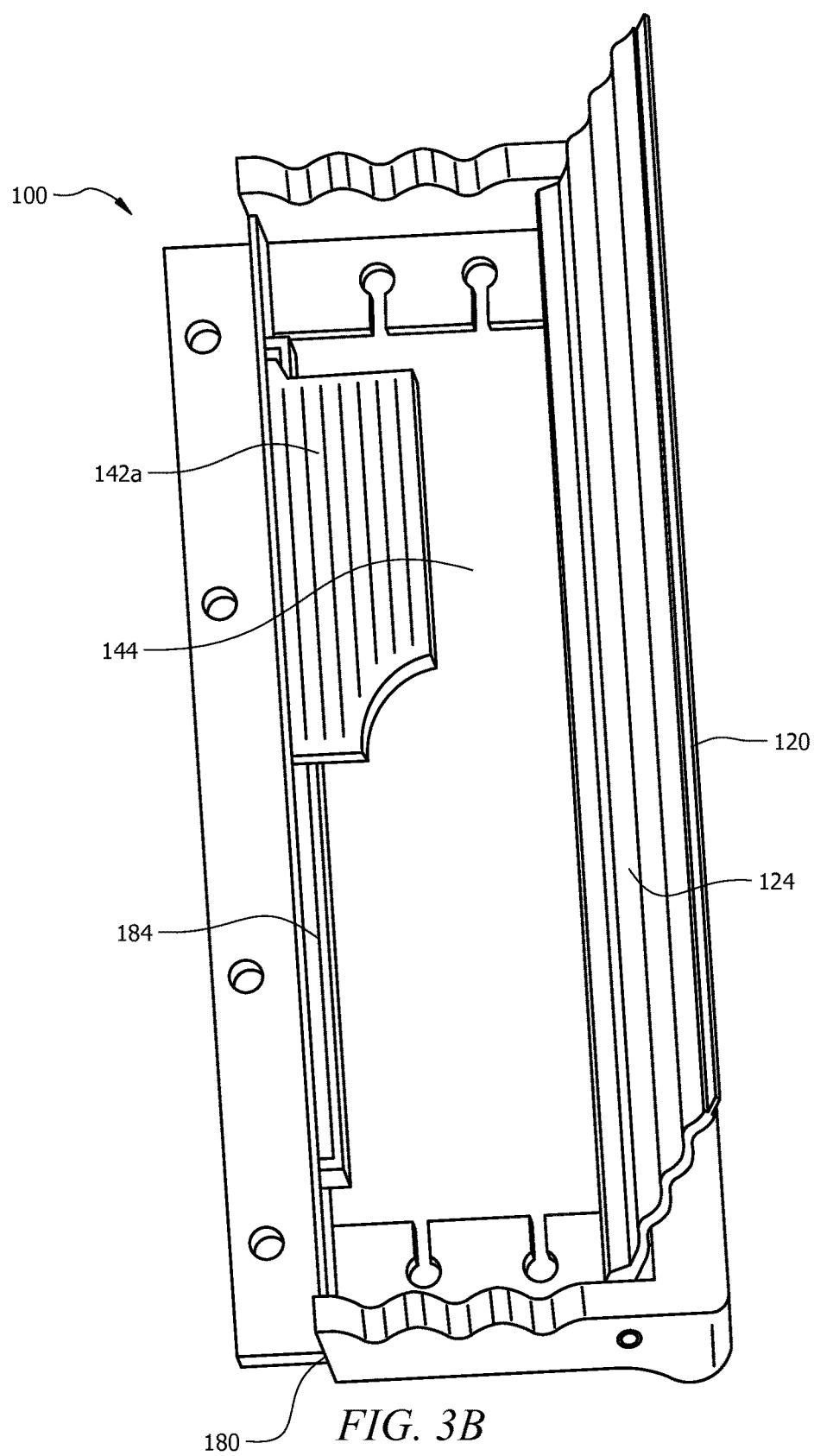
FIGS. 3b-3d are perspective views of components of the desktop organization and display stand arranged in representative configurations according to embodiments of the present disclosure.
Figure 3C:
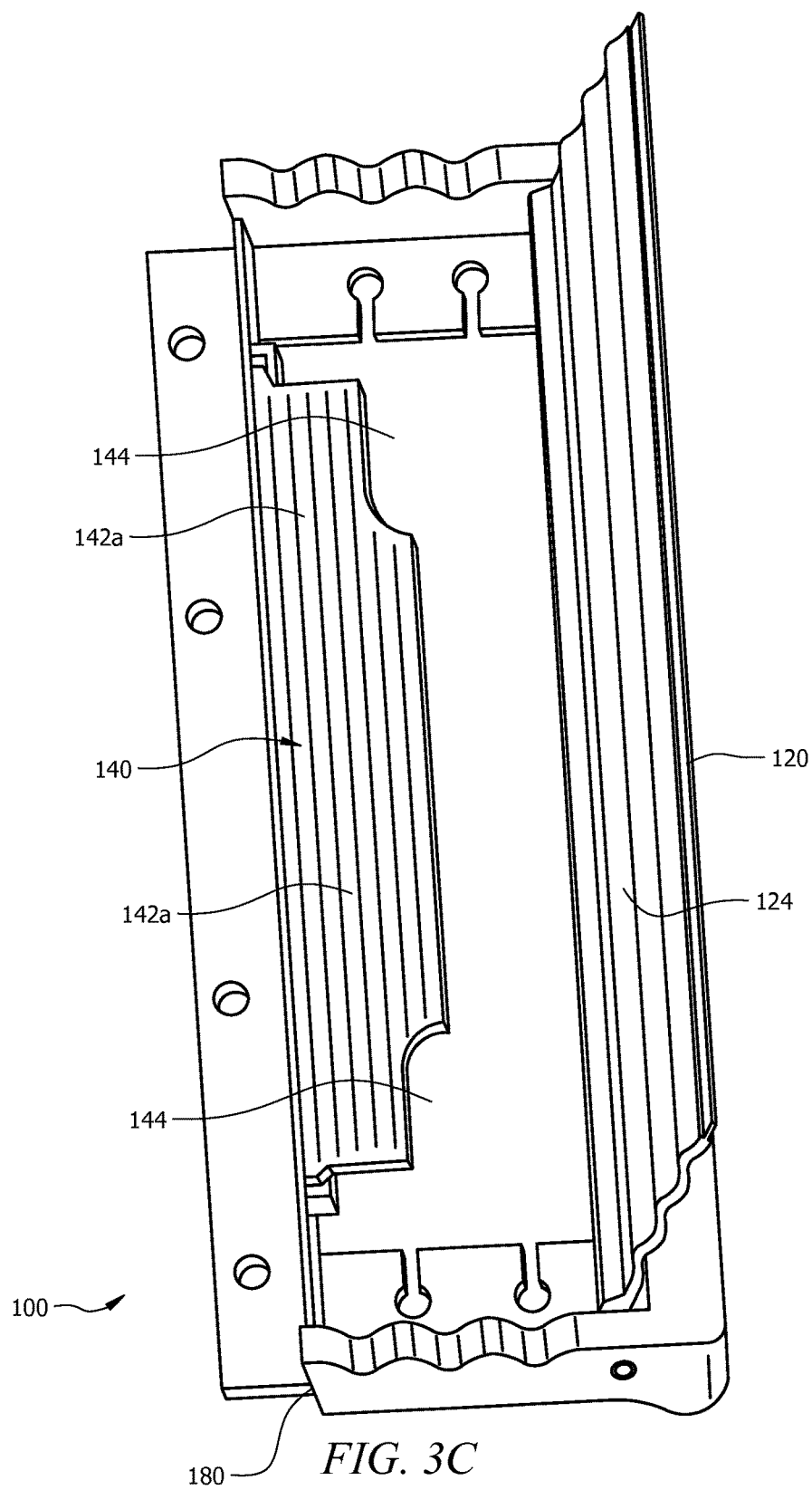
Figure 3D:
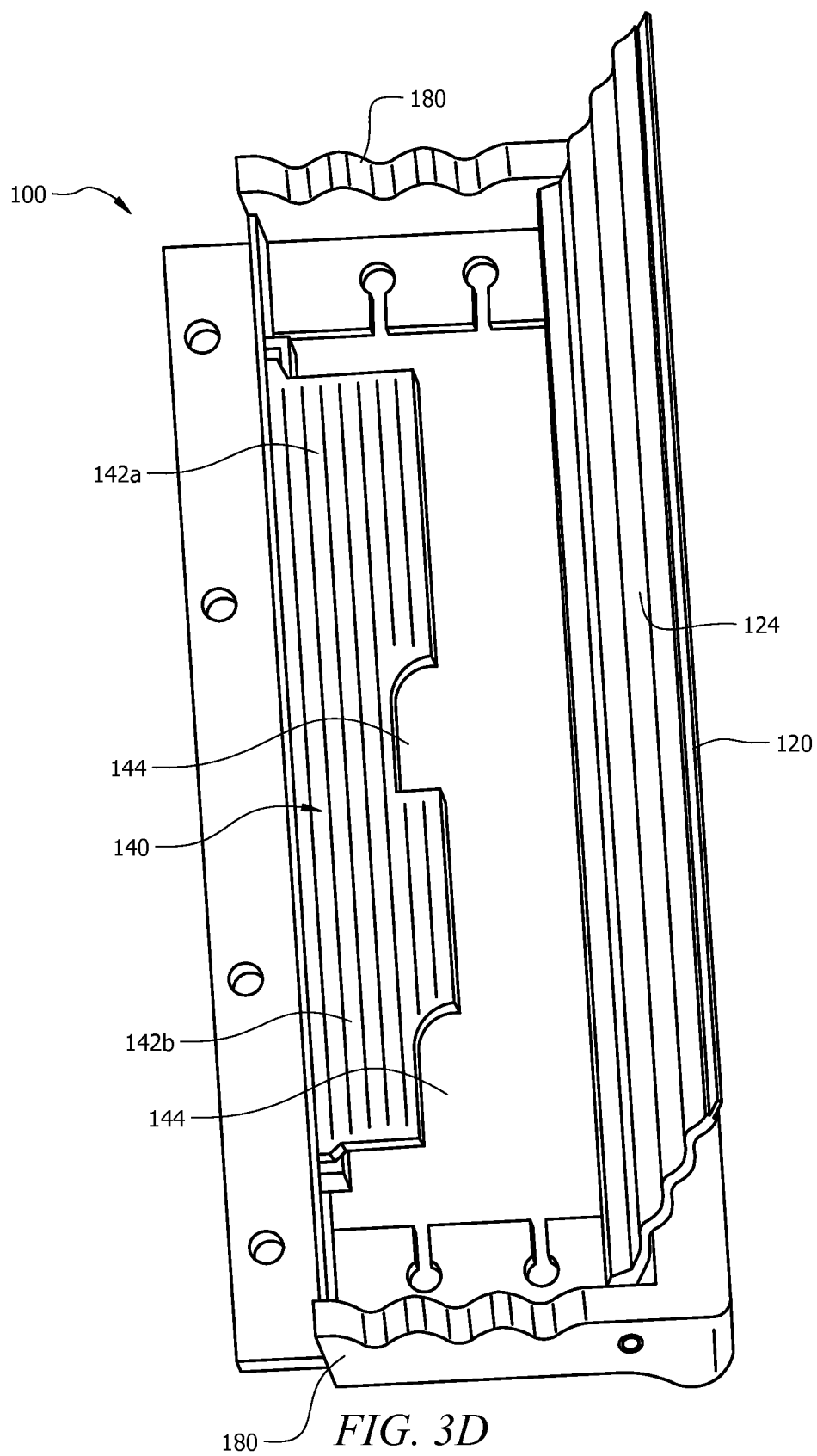

FIG. 3a provides a top view of system 100 generally illustrating ledge 10 and desk sleeve 180 according to one embodiment of the present disclosure.

In an embodiment, ledge 140 may generally comprise of support portions 142a and 142b. In various embodiments, support portions 142a and 142b may couple or otherwise connect to niche 184 of desk sleeve 180 in any suitable manner such as having male and female coupling adapters, using a latch, fastener, chain, belt, hook and loop fastener, any other suitable securing or retaining material, or any combination thereof.

FIGS. 3a-3d depicts representative configurations of support portion 142a and/or support portion 142b connecting or coupling to desk sleeve 180. Support portion 142a and/or support portion 142b may be oriented in a variety of configurations depending on the desired objects and/or electronic media devices to be displayed and stored by system 100. As shown in FIGS. 3a-3d, as one or both support portions 142a and 142b connect or couple to desk sleeve 180, port 144 is formed.

Port 144 may comprise any suitably shaped, sized, or configured area that may be employed to store, route, secure, or otherwise organize wires, cables, and other electronic devices according to embodiments of the present disclosure. In embodiments of the present disclosure, port 144 may be used to organize wire or cables associated with a tablet computer, laptop, a smart phone, computer, central processing unit (CPU), monitor, terminal, television, electronic display, external drive, storage device, computer accessory, lighting system, circuit breaker, electrical outlet, telecommunications-related outlet, Ethernet outlet, wide area network (WAN) outlet, satellite outlet, cable outlet, audio/visual outlet, wire management system, other suitable devices, objects, connections, outlets, or areas, or any combination thereof while supported by system 100.

In an alternative embodiment, support portions 142a and 142b may be orientated in a variety of positions within desk sleeve 180 to locate and Configure port 144 (or multiple ports 144) to allow for wire and cable management of a variety of devices.

In an embodiment, desk sleeve 180 may further include wire and cable holders 182a, 182b, 182c and 182d. In alternative embodiments, desk sleeve 180 may also include USB connections, outlets, other suitable devices, objects, or any combination thereof to easily provide access and connection to objects and electronic media devices supported by system 100.

Figure 3E:
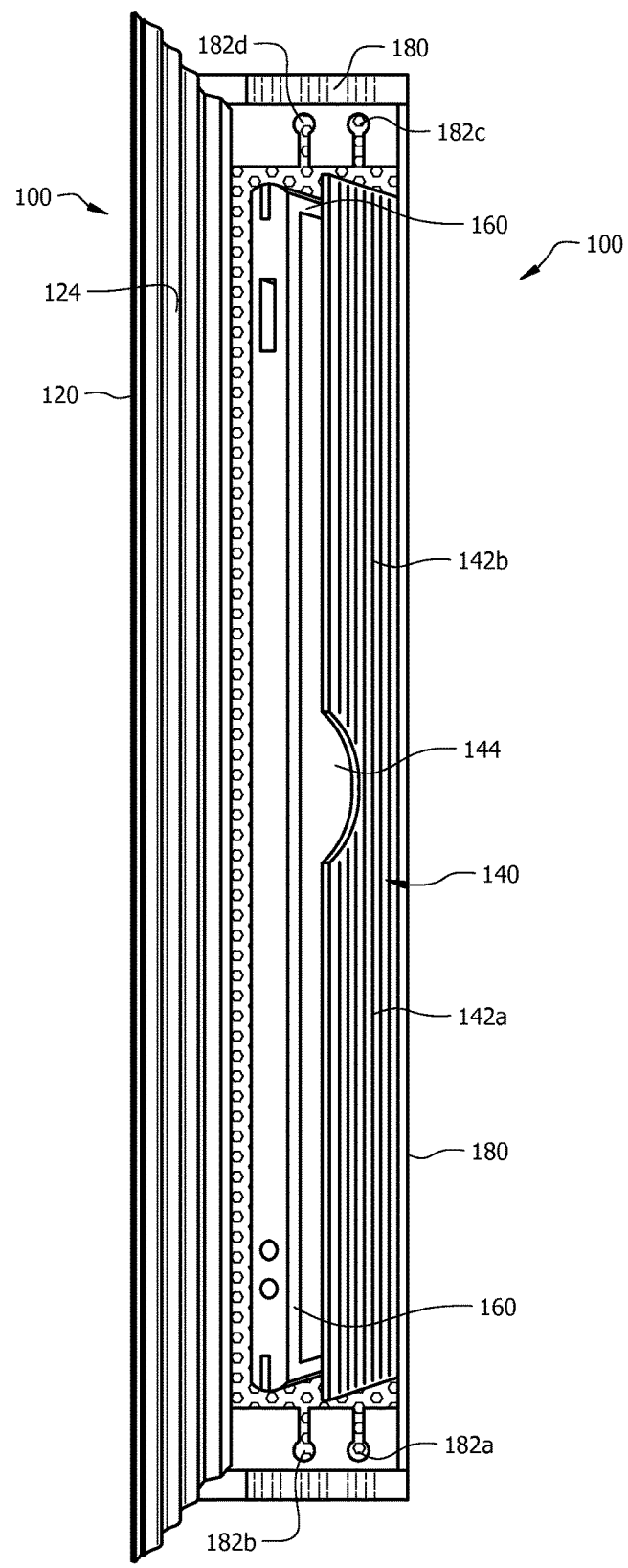
FIG. 3e is a top view of the desktop organization and display stand system employed to store items according to one embodiment of the present disclosure.

FIG. 3e generally depicts system 100 employed to store a tablet computer while not in use according to one embodiment of the present disclosure.

In other embodiments, system 100 may be employed to store a laptop computer, smart phone, electronic display, flat panel monitor, a television screen, liquid crystal display (LCD) screen, plasma screen, high definition television (HDTV) screen, projection television screen, computer screen, video conferencing display, other suitable devices, connections, outlets, books, magazines, documents, other printed material, records, compact discs, collectable paraphernalia, personal items, a marker board, magnetic board, chalk board, tack board, Sticker board, design board, other suitable objects and/or electronic media, or any combination thereof.

Figure 4:
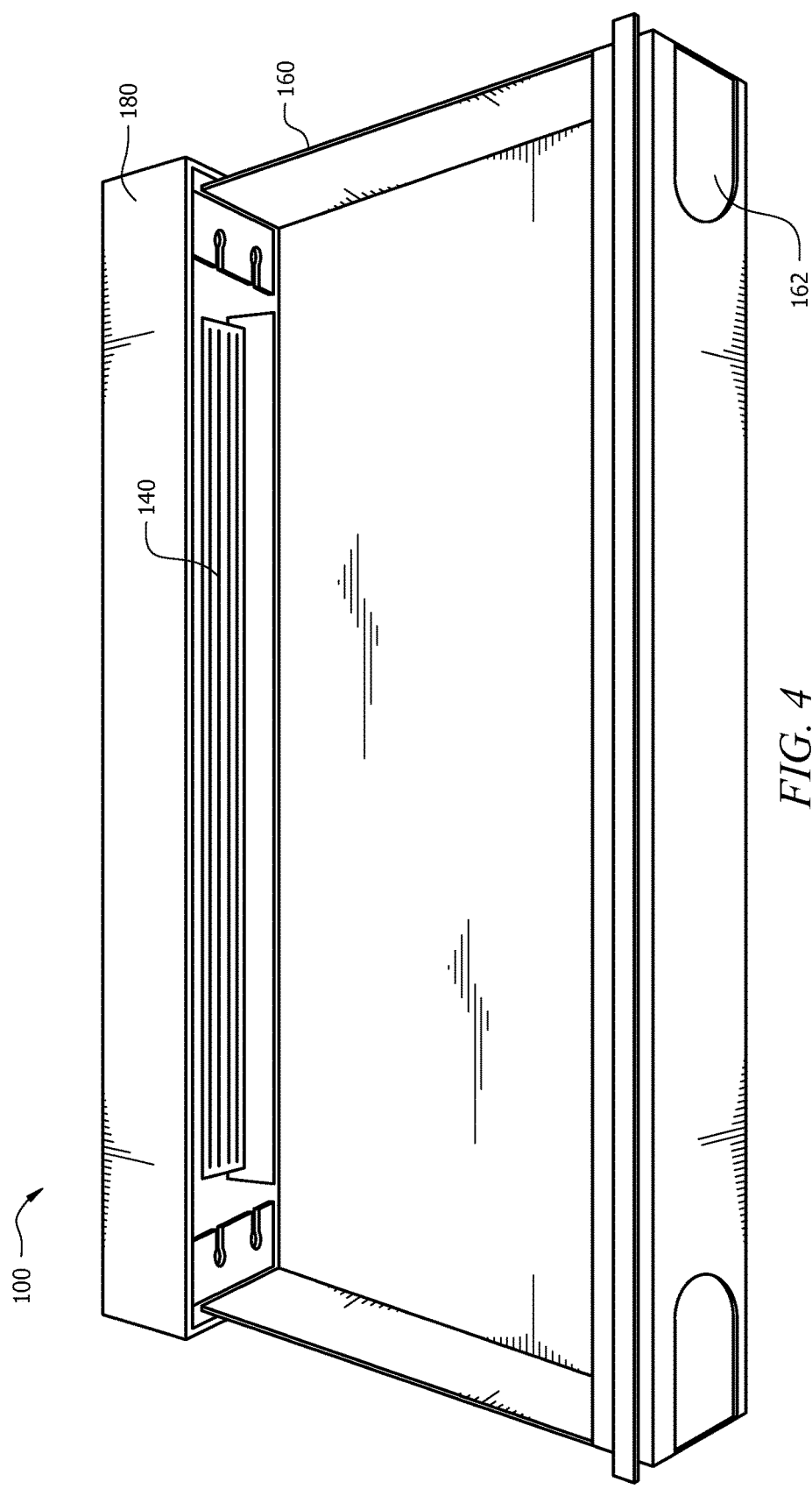
FIG. 4 is a bottom perspective view of components of a desktop organization and display stand system.

FIG. 4 generally illustrates nest 160 coupled to the bottom of desk sleeve 180. In one embodiment, nest 160 may provide a partial enclosure, as depicted in FIG. 4. In other embodiments, nest 160 may comprise a full enclosure.

In an embodiment, nest 160 may be connected or otherwise coupled to desk sleeve 180 in any suitable manner, such as, for example, having screw and socket attachments, clip or pin attachments, male and female coupling adapters, ball and socket attachments, or other suitable connections or coupling mechanisms, or any combination thereof.

Nest 160 may be employed to support and store a variety of objects and electronic media, as described above, while not in use. Nest 160 may include any suitable pocket, sleeve, tilted shelf, storage area, surface, platform, plane, or compartment. In one embodiment, nest 160 may include one or more dividing partitions to allow for the organization and storing of multiple objects and/or devices. In such embodiments, the dividing partitions may be adjusted or removed as desired.

In an embodiment, nest 160 may also be employed to support and partially store an object or electronic media device, while the object or electronic media device is in use.

Additionally, nest 160 may store any suitable electronic device, external drive, storage device, computer accessory, lighting system, circuit breaker, electrical outlet, electrical outlet, telecommunications-related outlet, Ethernet outlet, WAN outlet, satellite outlet, cable outlet, audio/visual outlet, wire management system, other suitable structures, connections, outlets, or areas, or any combination thereof.

In embodiments of the present disclosure, nest 160 may include one or more grommets 162 to route, secure, or otherwise organize wires, cables, and other such electronic device accessories associated with a tablet computer, a laptop, a smart phone, computer, central processing unit (CPU), monitor, terminal, television screen, electronic display, flat panel monitor, liquid crystal display (LCD) screen, plasma screen, high definition television (HDTV) screen, projection television screen, computer screen, video conferencing display, external drive, storage device, computer accessory, lighting system, circuit breaker, electrical outlet, telecommunications-related outlet, Ethernet outlet, wide area network (WAN) outlet, satellite outlet, cable outlet, audio/visual outlet, wire management system, other suitable devices, objects, connections, outlets, or areas, or any combination thereof.

Figure 5:
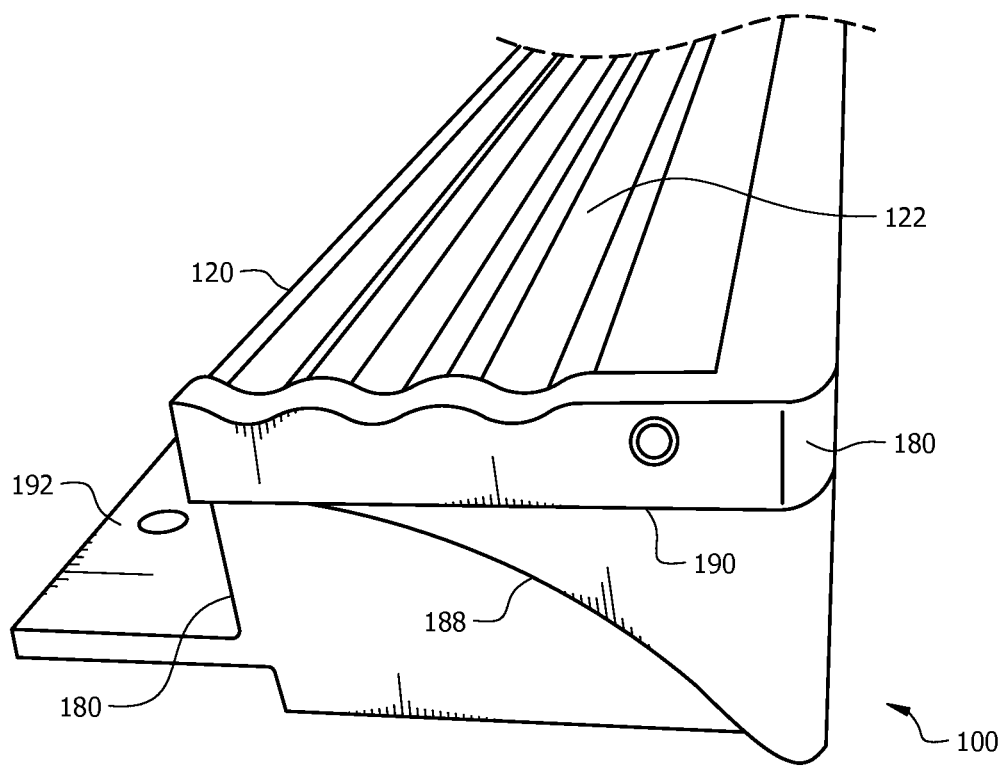
FIG. 5 is a side view of a desktop organization and display stand system according to one embodiment of the present disclosure.

FIG. 5 depicts a side view of system 100 according to one embodiment of the present disclosure further illustrating the compatibility of system 100 with a variety of desktop configurations, including rounded desktops, squared off desktops, existing desktops, and other suitable structures.

In one embodiment, system. 100 may be used in conjunction with desktops having a rounded edge. In such embodiments system 100 is integrated in the rounded desktop such that shoulder 188 frushly engages and abuts the rounded edge securing system 100 within the desktop and providing a continuous look.

In one embodiment, system 100 may be used in conjunction with desktops having a squared off edge. In such embodiments, system 100 is integrated in the desktop such that shoulder 190 flushly engages and abuts the squared off edge securing system 100 within the desktop and providing a consistent look to the desktop.

In one embodiment, system 100 may be used in conjunction with existing desktops. In such embodiments, system. 100 may couple or connect to the desktop via desk attachment 192.

Figure 6A:
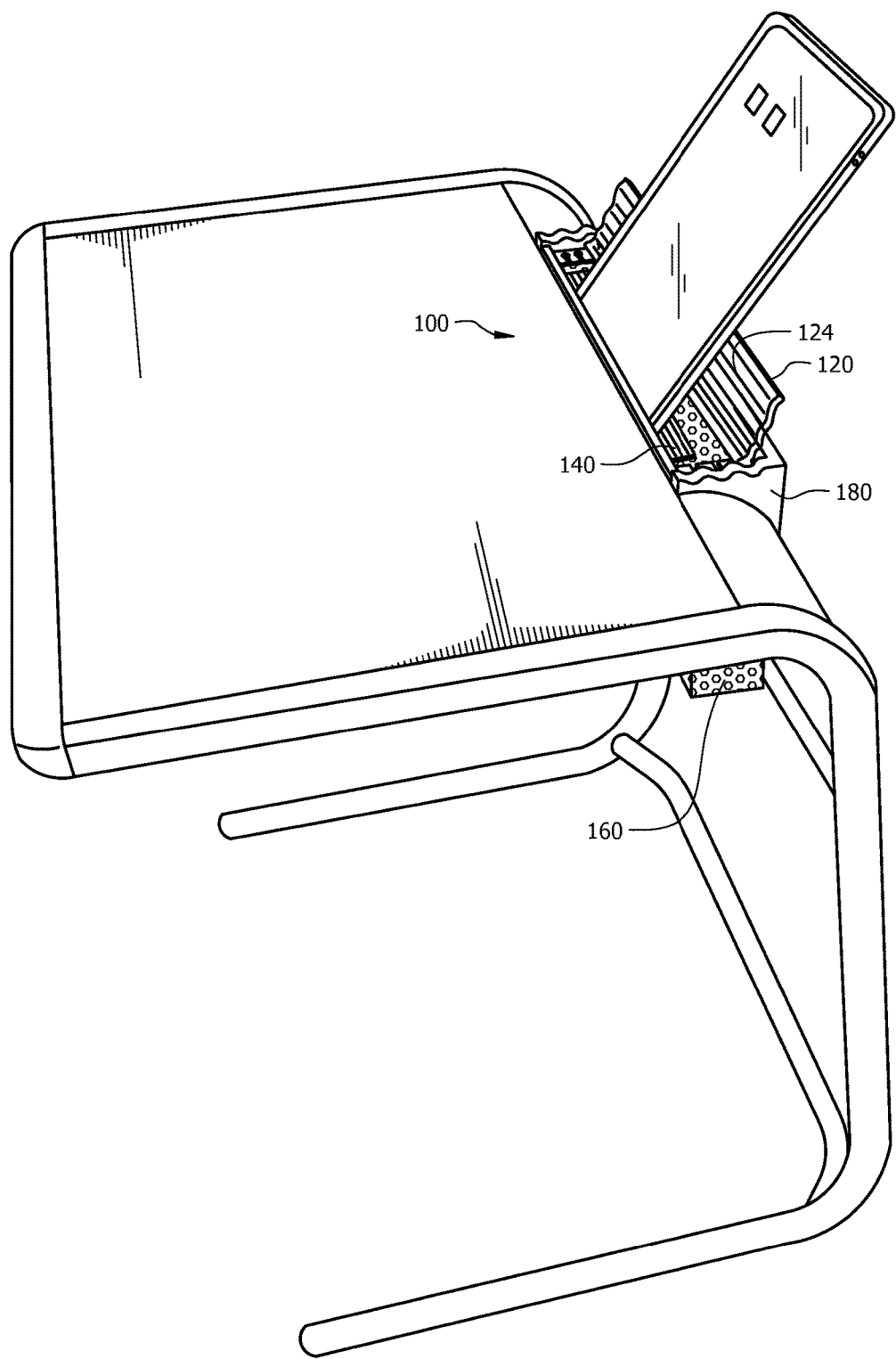
FIGS. 6a-6c provide perspective views of a desktop organization and display stand system integrated within a desk or workstation orientated in an engaged state and employed to accommodate a tablet computer according to one embodiment of the present disclosure.
Figure 6B:
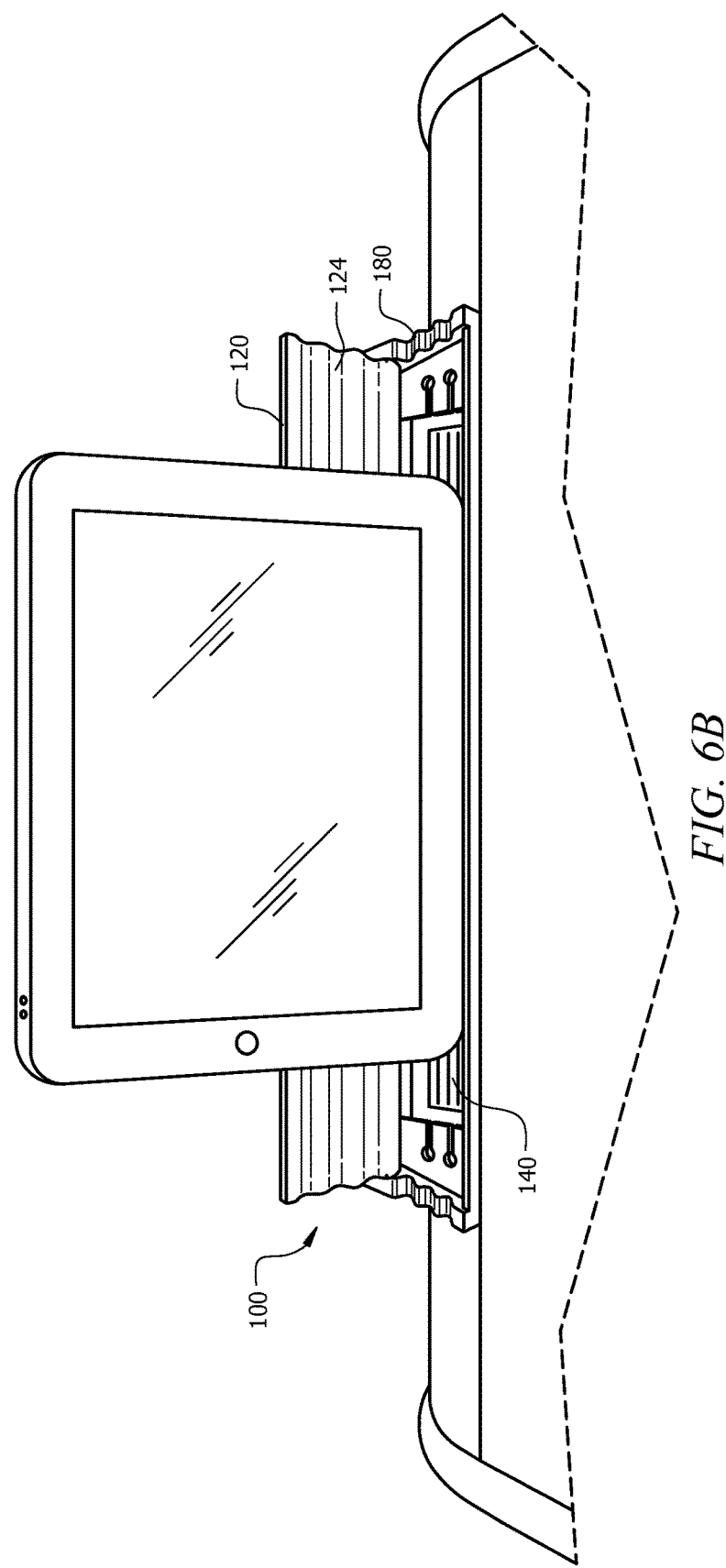
Figure 6C:
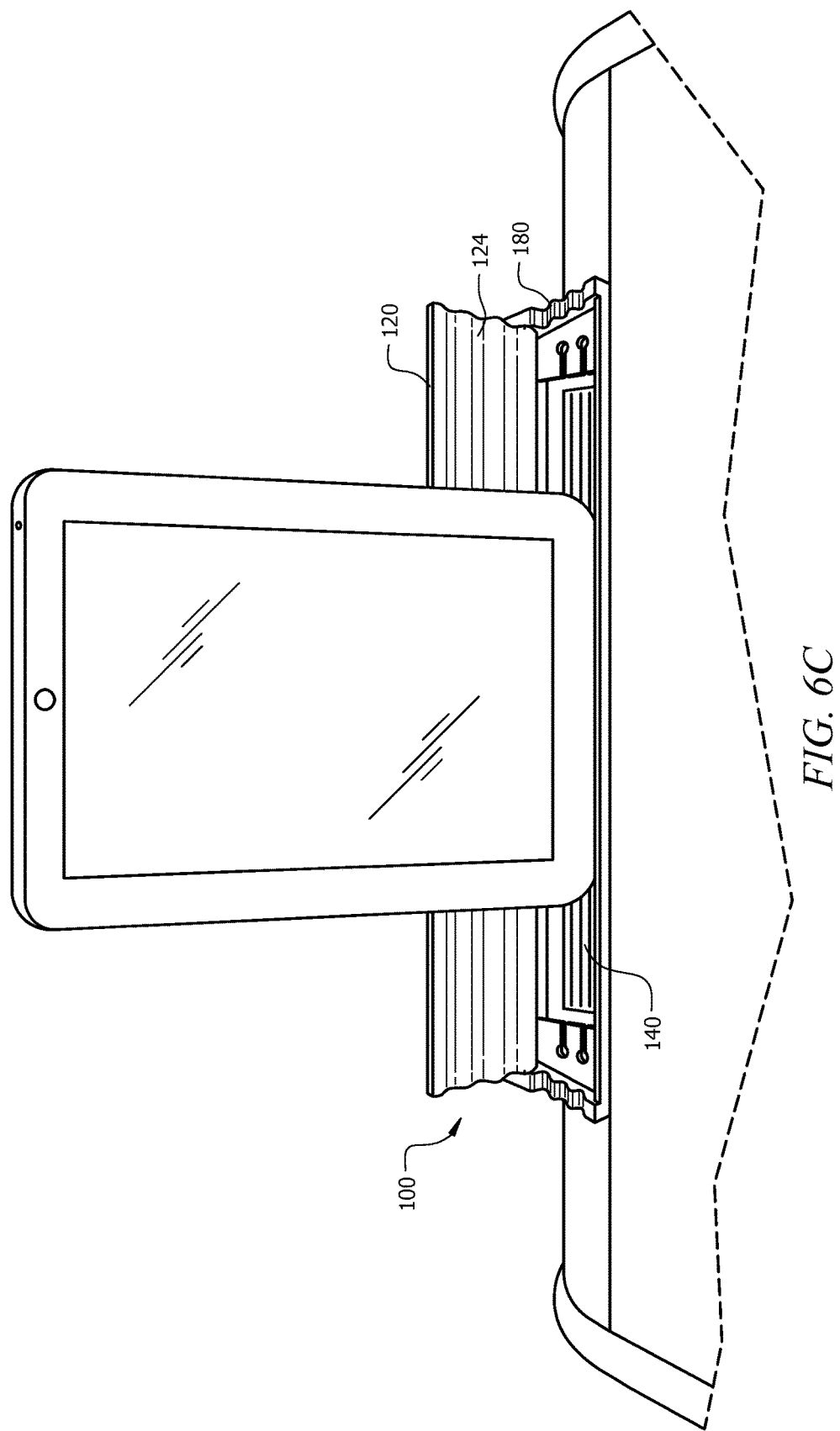

FIG. 6a-6c illustrate system 100 in the engaged state while being used to support a tablet computer in accordance with one embodiment of the present disclosure.

FIGS. 7-9 illustrate a desktop organization and display stand system 200 according to one embodiment of the present disclosure. It should be understood that system 200 is shown for illustrative purposes only and that any other suitable system or subsystem could be used in conjunction with, or in lieu of, system 200 according to one embodiment of the present disclosure.

In one embodiment, system 200 could generally be similar to system 100 shown in and described in conjunction with FIGS. 1-5 above (with like parts having similar numbers).

In embodiments of the present disclosure, system 200 allows the display and use of a variety of objects without engaging the desktop, thereby substantially extending the surface area of the desk or workstation.

In an embodiment, system 200 may comprise a pivot panel 220 and a ledge 240, each coupled to a desk sleeve 260 which may be integrated onto the top surface of a desk or workstation, as shown in FIG. 8.

Like system 100, system 200 may be adapted to conform to any desk configuration. In various embodiments, system 200 may be integrated at any position on the desktop as desired or necessary. For example, if a desk comprises a privacy wall or shield at the front of the desk, system 200 may be configured to be integrated inwardly on the desktop. Alternatively, system 200 may be coupled to the edge of a top surface of a desk or workstation, rather than being integrally constructed with the OEM. In this manner, system 200 could be retrofitted to any table, desk, workstation, or other structure.

Pivot panel 220 comprises a top surface 222 and a support surface 224.

The height, shape, size and other dimensions of pivot panel 220, ledge 240 and desk sleeve 260 may be varied depending on the desired objects and/or electronic media devices to be displayed and stored. For example, in some embodiments, the dimensions of pivot panel 220 may be increased when larger objects and/or electronic media devices are to be displayed and/or stored, such as a large bulletin board, large black board, large screen television, other large object and/or electronic media devices, or a combination thereof.

Pivot panel 220 may be connected or otherwise coupled to desk sleeve 260 in any suitable manner such as having male and female coupling adapters, having a ball and socket attachment, having a brass ring and chain attachment, a clip or Pin attachment, or using other suitable coupling materials, or any combination thereof.

Figure 7A:
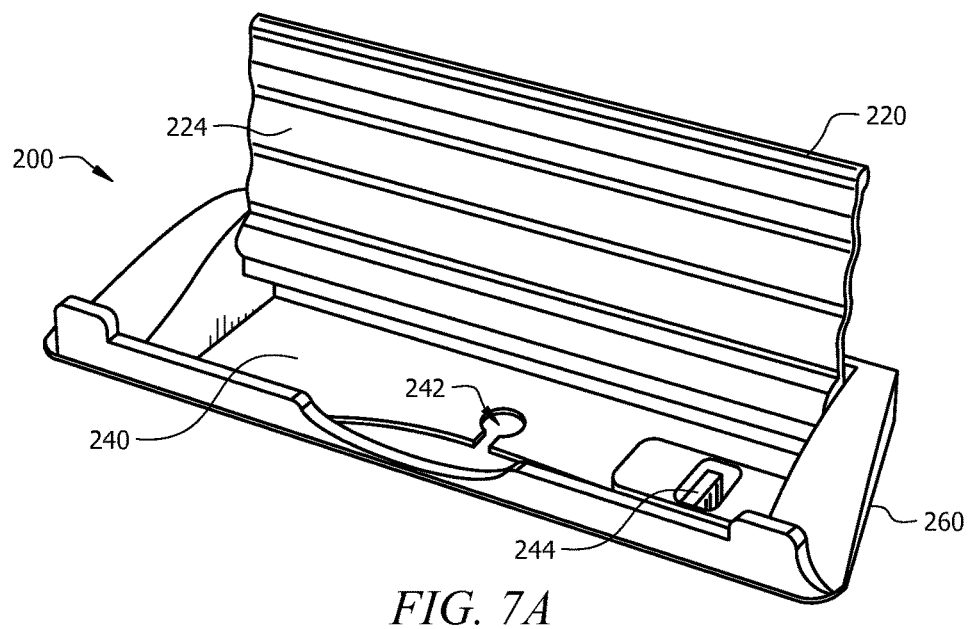
FIG. 7a is a perspective view of a desktop organization and display stand system oriented in an engaged state according to one embodiment of the present disclosure.

In an engaged state, as shown in FIG. 7a, system 200 may be employed to accommodate a variety of objects, which may rest on ledge 240 and be braced by support surface 224.

In alternative embodiments, ledge 240 may be coupled or otherwise connected to support surface 224.

In some embodiments, ledge 240 may comprise port 242. Port 242 may comprise any suitably shaped, sized, or configured area that may be employed to store, route, secure, or otherwise organize wires, cables, and other electronic devices according to embodiments of the present disclosure. In embodiments of the present disclosure, port 242 may be used to organize wire or cables associated with a tablet computer, a laptop, a smart phone, computer, central processing unit (CPU), monitor, terminal, television, electronic display, external drive, storage device, computer accessory, lighting system, circuit breaker, electrical outlet, telecommunications-related outlet, Ethernet outlet, wide area network (WAN) outlet, satellite outlet, cable outlet, audio/visual outlet, wire management system, other suitable devices, objects, connections, outlets, or areas, or any combination thereof while supported by system 100.

In various embodiments, port 242 may be orientated in a variety of positions disposed along ledge 240 to route, secure, or otherwise organize wires, cables, and other such electronic device accessories associated with a tablet computer, a laptop, a smart phone, computer, central processing unit (CPU), monitor, terminal, television screen, electronic display, flat panel monitor, liquid crystal display (LCD) screen, plasma screen, high definition television (HDTV) screen, projection television screen, computer screen, video conferencing display, external drive, storage device, computer accessory, lighting system, circuit breaker, electrical outlet, telecommunications-related outlet, Ethernet outlet, wide area network (WAN) outlet, satellite outlet, cable outlet, audio/visual outlet, wire management system, other suitable devices, objects, connections, outlets, or areas, or any combination thereof.

In an embodiment, ledge 240 may further include one or more USB connections 244, outlets, other suitable devices, objects, or any combination thereof to easily provide access and connection to objects and electronic media devices supported by system 200.

In embodiments of the present disclosure, ledge 240 may include one or more grommets to facilitate access of wires and cables to desired objects and/or electronic, media devices supported by system 200. As generally illustrated in FIGS. 7c and 7d, in some embodiments, ledge 240 and/or desk sleeve 260 may also include one or more power pop-ups, audio connections, video connections, other suitable, device connections, or any combination thereof.

Figure 7B:
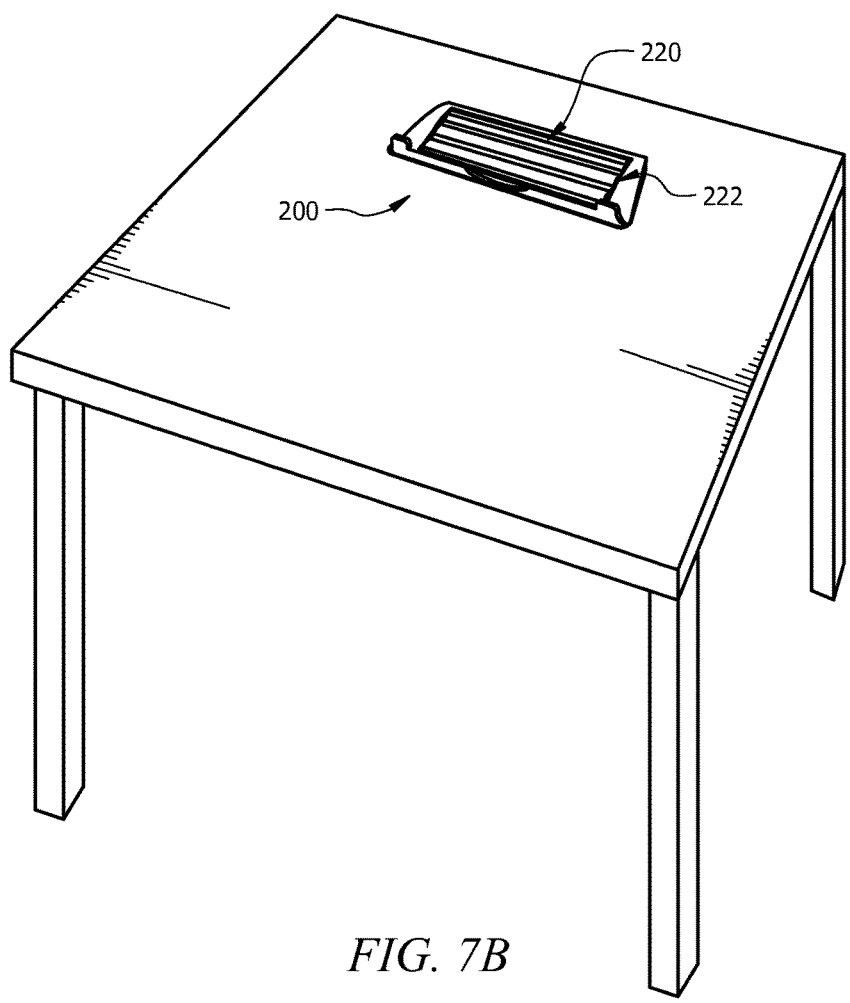
FIG. 7b is a perspective view of the desktop organization and display stand system of FIG. 7a integrated within a desk or workstation and oriented in a disengaged state according to one embodiment of the present disclosure.
Figure 7C:
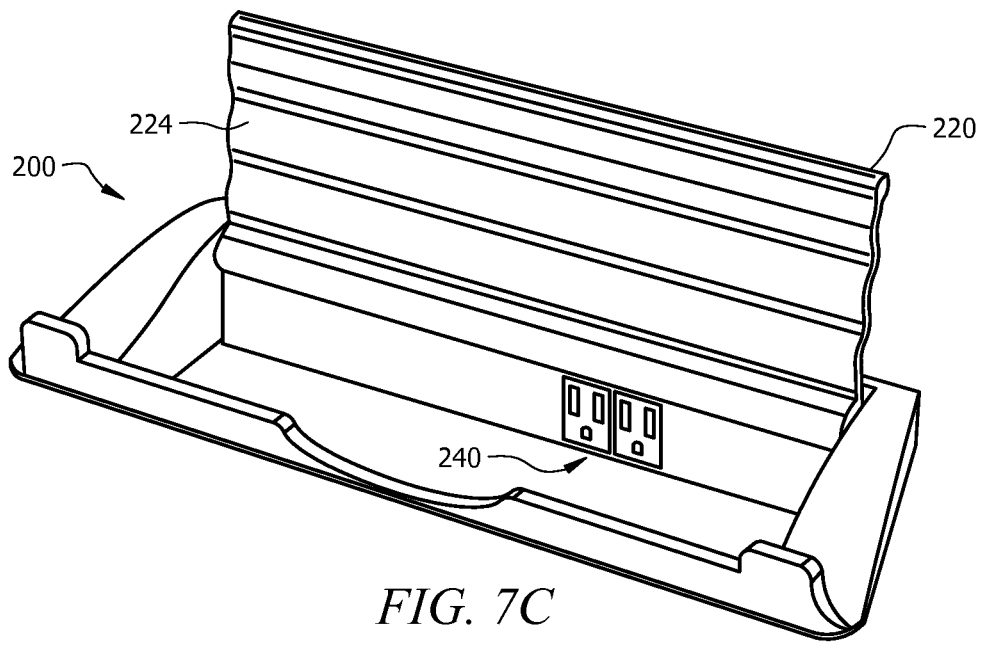
FIGS. 7c and 7d provide perspective views of components of the desktop organization and display stand of FIGS. 7a and 7b arranged in representative configurations according to embodiments of the present disclosure.
Figure 7D:
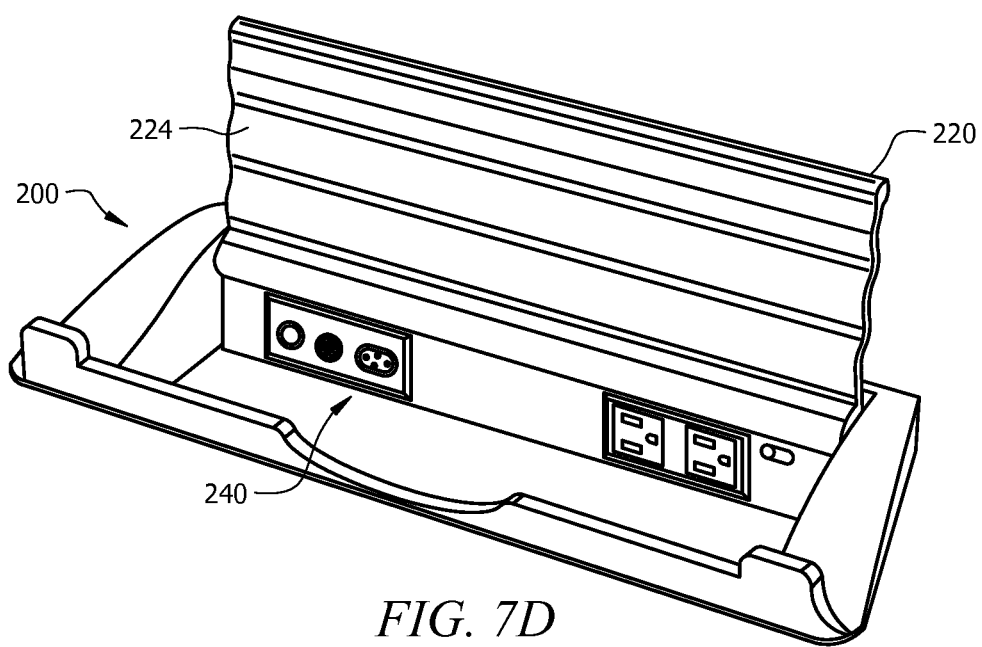

FIG. 7b depicts a perspective view of system 200 integrated within a desk or workstation and oriented in disengaged state.

In the disengaged state, pivot panel 220 flushly abuts the top of desk sleeve 260 such that the top surface 222 is exposed and a continuous look to the surface plane of the desk is provided according to one embodiment of the present disclosure.

In the disengaged state, top surface 222 may be employed as part of the desk surface, workspace, writing surface, storage space, organization platform, other suitable uses, or any combination thereof.

In one embodiment, top surface 222 may have ridges or grooves that may be employed to store pens, pencils, markers, other writing instruments, styli. Other working instruments, other suitable objects, or any combination thereof.

In one embodiment accessories, cups, holders and other suitable retaining mechanisms may be attached to the sides, back or front of system 200 to accommodate additional objects and/or electronic media devices, such as, for example pens, pencils, markers, other writing instruments, styli, other working instruments, batteries, cables, water bottles, soda bottles, juice bottles, coffee cups, mp3 players, audio devices, cellular phones, smart phones, cameras, other suitable objects or electronic media devices, or a combination thereof.

FIGS. 9a-9c depict a top view, front view, and side view of system 200, respectively, according to one embodiment of the present disclosure further illustrating the compatibility of system 200.

In one embodiment, system 200 may be retrofitted to the top surface of any desktop. In such embodiments, system 200 is integrated in the desktop such that shoulder 262 flushly engages and abuts the top surface of the desktop so as to secure system 200 within the desktop and providing a continuous look.

In one embodiment, system 200 may be used in conjunction with existing desktops. In such embodiments, system 200 may be coupled or connected to the top desktop in any suitable manner or method.

Figure 10:
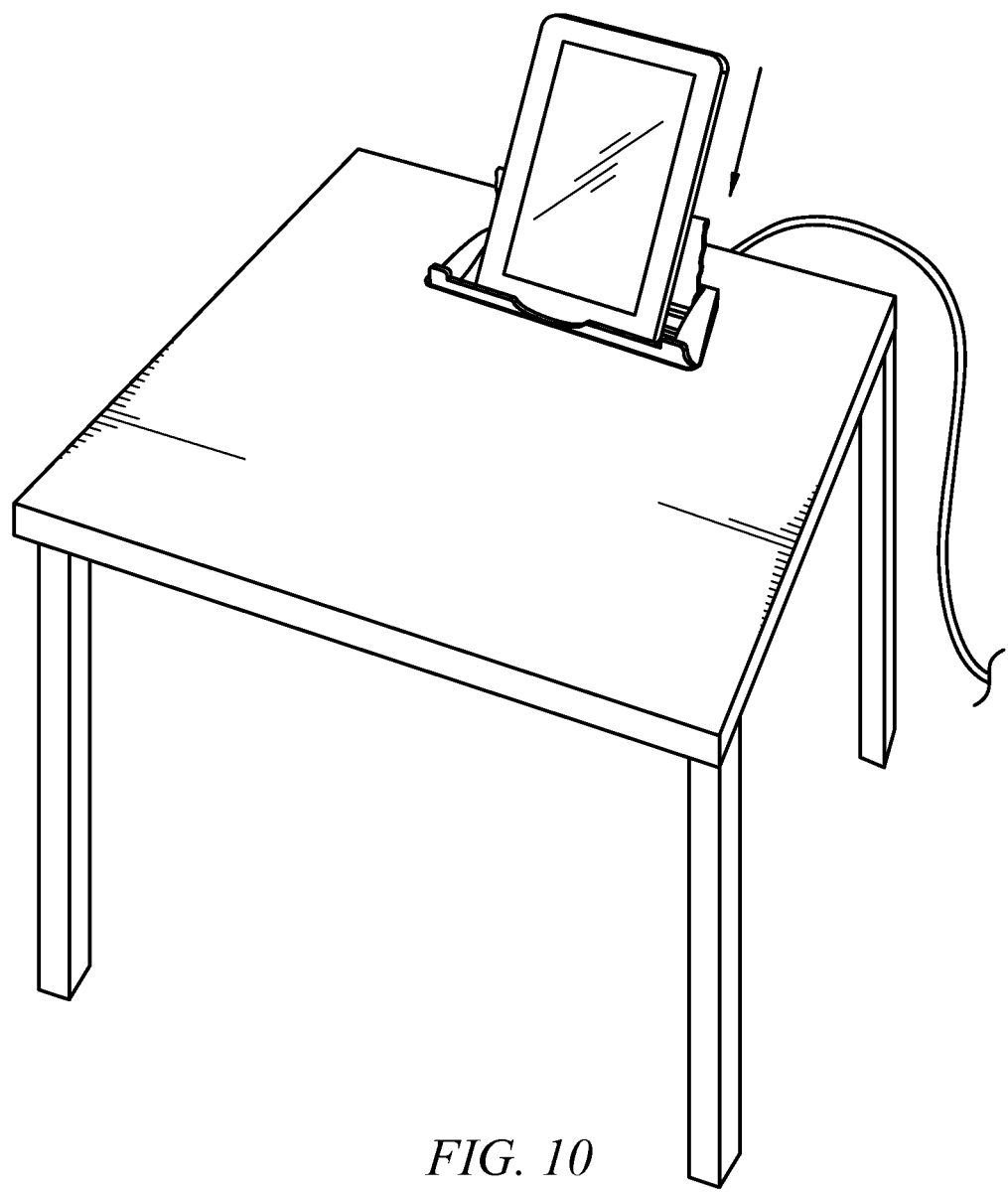
FIG. 10 provides a perspective view of a desktop organization and display stand system integrated within a desk or workstation orientated in an engaged state and employed to accommodate a tablet computer according to one embodiment of the present disclosure.

FIG. 10 illustrates system 200 in the engaged state while being used to support a tablet computer in accordance with one embodiment of the present disclosure.

In embodiments of the present disclosure, any of pivot panel. 120, top surface 122, support surface 124, ledge 140, support portions 142a and 142b, pivot panel 220, top surface 222, support surface 224, and/or ledge 240 may be made of, composed of, or otherwise include plastic, laminate, veneer, wood, cork, medium density fiber (MDF) board, particle board, melamine, granite, solid surface, tile, ceramic fiberglass, soap stone, engineering stone, Marble, concrete, Slate, wood, butcher block, glass, steel, stainless steel, aluminum, metal, mesh, apertured material, mirror, polypropylene, polyurethane, polyethylene, polyvinyl chloride (PVC), silicon, polytetrafluoroethylene (PTEE), polyester, high-gloss polyester, synthetic rubber, natural rubber, polymer, fabric, natural fiber, synthetic fiber, other suitable materials, or any combination thereof.

In one embodiment, ledge 140 and/or ledge 240 may be made of, composed of, or otherwise include rubber or other suitable material with a high coefficient of friction to prevent objects and/or electronic media devices supported by ledge 140 and/or ledge 240 from moving or sliding out of place. Ledge 140 and/or ledge 240 may also be made of a rubber or other suitable material of medium rigidity to protect the object and/or device from scratching or injury while the object and/or device is being displayed, as well as when the object and/or device is being slid past ledge 140 to be deposited in nest 160.

Any of the nest 160, desk sleeve 180, desk sleeve 260 and/or wire and cable holders 182a, 182b, 182c and 182d may be made of plastic, metal, mesh, steel, aluminum, brass, bronze, nylon, wood, laminate, veneer, steel, stainless steel, apertured material, polypropylene, polyurethane, polyethylene, polyvinyl chloride (PVC), silicon, polytetrafluoroethylene (PTFE), polyester, high-gloss polyester, laminate, synthetic rubber, natural rubber, plexiglass, polymer, other suitable materials, or any combination thereof.

In one embodiment, the interior surface of nest 160 may be made of, composed of, or otherwise include a soft lining, cushioned coating, smooth layer to protect the surface or screens of objects and/or devices that may be stored or supported by nest 160 from scratching or injury. In one embodiment, the interior surface of nest 160 may be made of, composed of, or otherwise include natural rubber, synthetic rubber, polymer, natural fiber, synthetic fiber, polyester, nylon, cotton, cotton mesh, vinyl, other suitable material, or any combination thereof.

In an embodiment, any of pivot panel 120, top surface 122, support surface 124, ledge 140, support portions 142a and 142b, nest 160, desk sleeve 180, wire and cable holders 182a, 182b, 182c and 182d, pivot panel 220, top surface 222, support surface 224, ledge 240, and/or desk sleeve 260 may include any number of suitable coatings and layers to substantially reduce scratching or injury to an object or electronic media device supported or retained within system 100 and/or system 200, as well as to any surface engaged by system 100 and/or system 200.

In one embodiment, the coatings and layers applied to any of pivot panel 120, top surface 122, support surface 124, ledge 140, support portions 142a and 142b, nest 160, desk sleeve 180, wire and cable holders 182a, 182b, 182c and 182d, pivot panel 220, top surface 222, support surface 224, ledge 240, and/or desk sleeve 260 may be made of natural rubber, synthetic rubber, polymer, natural fiber, synthetic fiber, polyester, nylon, cotton, cotton mesh, vinyl, other suitable material, or any combination thereof.

In one embodiment, the coatings and layers applied to any of pivot panel 120, top surface 122, support surface 124, ledge 140, support portions 142a and 142b, nest 160, desk sleeve 180, wire and cable holders 182a, 182b, 182c and 182d, pivot panel 220, top surface 222, support surface 224, ledge 240, and/or desk sleeve 260 may be embellished with different colors, patterns, camouflage patterns, wood grain patterns, novelty items, ornamental items, stickers, removable stickers, paints, stencils, chalks, designs, images, other decorative materials, or any combination thereof to enhance or otherwise achieve the desired décor of the surroundings.

It may be advantageous to set forth definitions of certain words and phrases used in this patent document. The term "couple" and its derivatives refer to any direct or indirect communication between two or more elements, whether or not those elements are in physical contact with one another. The terms "include" and "comprise," as well as derivatives thereof, mean inclusion without limitation. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like.

Although the present disclosure and its advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure, processes, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. A desktop stand system comprising:
a desk sleeve adapted to couple to a desktop, wherein the desk sleeve comprises a first side and a second opposing side;
a pivot panel coupled to the first side of the desk sleeve, wherein the pivot panel comprises a top surface and an opposing support surface, wherein the pivot panel is flippable between a closed position and an open position, and wherein the pivot panel allows an object to be braced by the support surface when the pivot panel is in an open position, and wherein the object comprises at least one of:
electronic display, flat panel monitor, television, book, magazine, electronic media device, electronic device, bulletin board, or blackboard;
a ledge coupled to the first side of the desk sleeve, wherein the ledge extends from the first side of the desk sleeve, and wherein the ledge is capable of supporting the object braced by the support surface, and wherein the ledge comprises:
a first end proximate a pivot point of the pivot panel; and
a second opposing end; and
an opening disposed between the second end of the ledge and the second side of the desk sleeve, wherein the opening is disposed proximate the second end of the ledge, wherein the opening allows access to an area disposed below the ledge to allow storage.

2. The desktop stand system of claim 1 wherein a lower surface of the desk sleeve is coupled to a portion of a flat edge of the desktop.

3. The desktop stand system of claim 1 wherein the desk sleeve is disposed within a surface of a desktop.

4. The desktop stand system of claim 1 wherein the ledge is coupled to an inner surface of the desk sleeve.

5. The desktop stand system of claim 1 further comprising one or more additional ledges.

6. The desktop stand system of claim 1 wherein when the pivot panel is in the open position, the pivot panel leans against the desk sleeve such that the pivot panel and the ledge form a desktop stand.

7. The desktop stand system of claim 1 further comprising one or more ports to secure at least one of a wire or a cable, and wherein one or more of the ports is disposed in at least one of the ledge or the desk sleeve.

8. The desktop stand system of claim 1 wherein the ledge comprises at least one USB connection.

9. The desktop stand system of claim 1 wherein the top surface comprises ridges to retain other types of objects when the pivot panel is in the closed position.

10. A desktop stand comprising:
a desk sleeve adapted to couple to a desktop, wherein the desk sleeve comprises a first side and a second opposing side;
a pivot panel coupled to the first side of the desk sleeve, wherein the pivot panel is capable of being pivoted between a closed position and an open position, wherein the pivot panel pivots from the closed position to contact the desk sleeve in the open position; and wherein the pivot panel allows an object to be braced by the pivot panel in an open position, and wherein the object comprises at least one of:
electronic display, flat panel monitor, television, book, magazine, electronic media device, electronic device, bulletin board, or blackboard;
a ledge coupled to the first side of the desk sleeve, wherein the ledge extends from the first side of the desk sleeve, and wherein the ledge is capable of supporting the object braced by the support surface; and
an opening disposed between the ledge and the second opposing side of the desk sleeve, wherein the opening allows access to an area disposed below the ledge.

11. The desktop stand of claim 10 wherein the opening allows access to an area disposed below the ledge to allow storage of at least one of wires, cables, or other electronic accessories of the object braced by the pivot panel.

12. The desktop stand system of claim 10 wherein a lower surface of the desk sleeve is coupled to a portion of a flat edge of the desktop.

13. The desktop stand system of claim 10 wherein the desk sleeve is disposed within a surface of a desktop.

14. The desktop stand system of claim 10 wherein the ledge is coupled to an inner surface of the desk sleeve.

15. The desktop stand system of claim 10 further comprising one or more additional ledges.

16. The desktop stand system of claim 10 wherein when the pivot panel is in the open position, the pivot panel leans against the desktop desk sleeve such that the pivot panel and the ledge form a desktop stand.

17. The desktop stand system of claim 10 further comprising one or more ports to secure at least one of a wire or a cable, and wherein one or more of the ports is disposed in at least one of the ledge or the desk sleeve.

18. The desktop stand system of claim 10 wherein the ledge comprises at least one USB connection.

19. The desktop stand system of claim 10 wherein the top surface comprises ridges to retain other types of objects when the pivot panel is in the closed position.

20. A desk comprising:
a desk sleeve, wherein the desk sleeve comprises a first side and a second opposing side; and wherein the desk sleeve comprises a rim, and wherein the rim extends beyond a top surface of a desk;
a pivot panel coupled to the first side of the desk sleeve, wherein the pivot panel is capable of being pivoted between a closed position and an open position, and wherein the pivot panel allows an object to be braced by the pivot panel in an open position, and wherein the object comprises at least one of:
electronic display, flat panel monitor, television, book, magazine, electronic media device, electronic device, bulletin board, or blackboard;
a ledge coupled to the first side of the desk sleeve, wherein the ledge extends from the first side of the desk sleeve, and wherein the ledge is capable of supporting the object braced by the support surface; and
an opening disposed between the ledge and the second opposing side of the desk sleeve, wherein the opening allows access to an area disposed below the ledge.

* * * * *